March 27, 1962 E. F. DUFFY 3,027,030
TRACTOR-TRAILER DRAWBAR COUPLING
Filed March 11, 1960
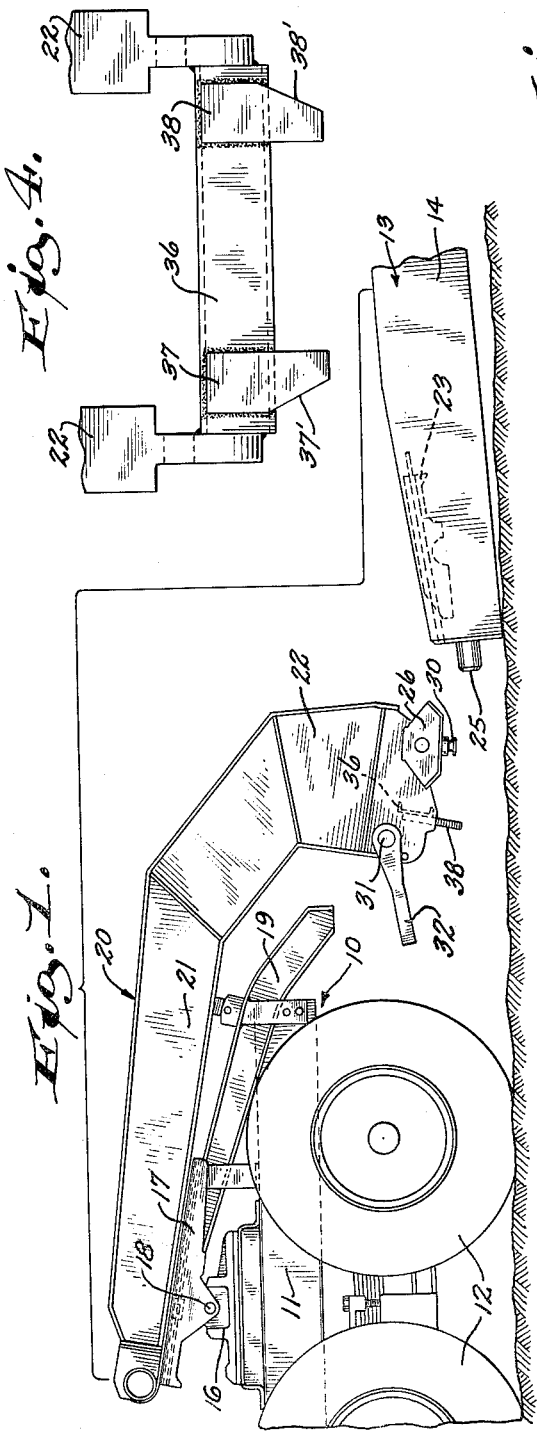
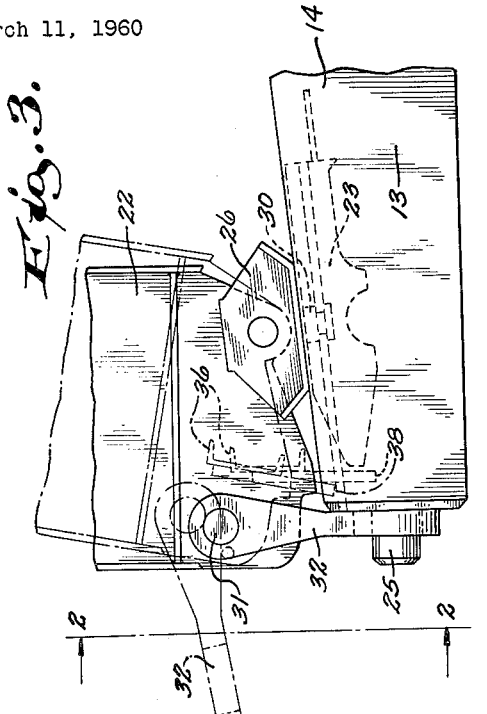
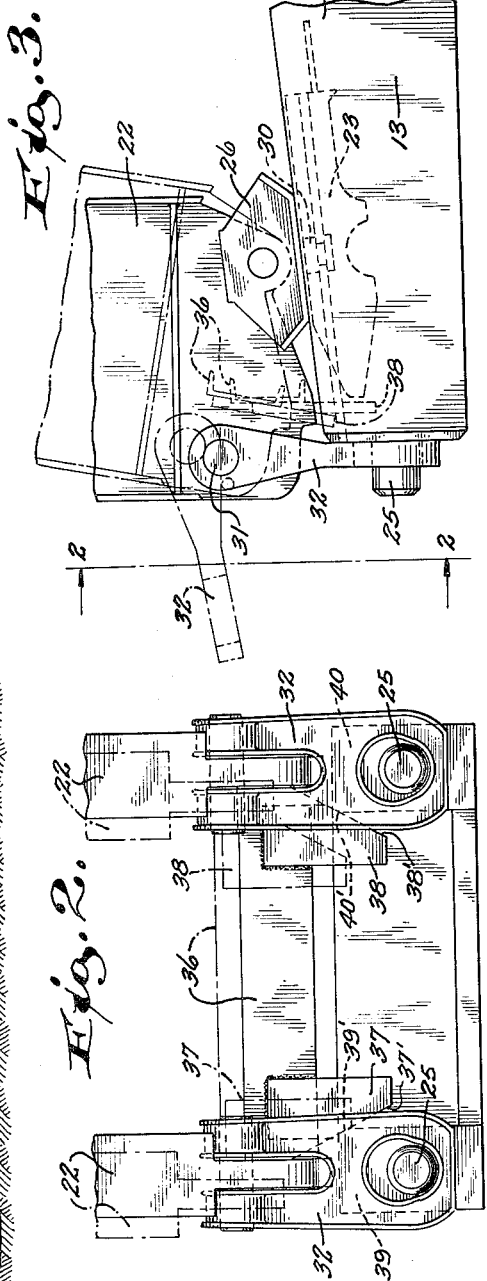
INVENTOR.
Edward F. Duffy,
BY Morsell & Morsell
ATTORNEYS.

United States Patent Office 3,027,030
Patented Mar. 27, 1962

3,027,030
TRACTOR-TRAILER DRAWBAR COUPLING
Edward F. Duffy, La Crosse, Wis., assignor to La Crosse Trailer Corporation, La Crosse, Wis., a corporation of Wisconsin
Filed Mar. 11, 1960, Ser. No. 14,291
1 Claim. (Cl. 214—505)

This invention relates to improvements in tractor-trailer drawbar coupling, and more particularly to a coupling mechanism for a detachable gooseneck drawbar in a tractor-trailer assemblage having integral means thereon insuring perfect alignment of the tractor-carried drawbar and the trailer during the coupling operation.

Tractor and low-bed trailer assemblages are in common usage and the low-bed semi-trailer has rear wheels but is normally supported at its forward end by a "gooseneck" type of drawbar which is secured to the rear of the tractor. Such low bed semi-trailers are especially suited for hauling heavy machinery and for this purpose the drawbar is usually completely disconnected from the trailer while remaining connected to the tractor, thereby permitting the front end of the trailer to be lowered into contact with the ground for loading and unloading. After the low-bed trailer has been loaded or unloaded, the tractor, carrying the gooseneck, is backed into alignment with the front end of the trailer and the gooseneck drawbar is again coupled to the trailer to put the assemblage in transportable condition.

An improved coupling mechanism for such tractor and low-bed trailer assemblages is disclosed in my issued Patent No. 2,822,945, dated February 11, 1958. Said arrangement permits the units to be quickly and easily connected regardless of the inclination of the front end of the trailer, and it is this type of coupling with which the present invention is primarily concerned. It is to be understood, however, that the improved mechanism hereinafter described, or modifications thereof, might also be advantageously employed in coupling mechanisms other than that specifically described in my said earlier patent, and the invention is not to be limited in this respect.

With front end loading tractor-trailer assemblages of the type described, it has been found that it is extremely difficult to back the tractor into the exact position required to engage the rear end of the drawbar with the trailer and considerable time and effort is usually spent maneuvering the tractor into the proper coupling position. With this in mind, the principal object of the present invention is to provide a coupling mechanism having means thereon which automatically align the trailer with the rear end of the drawbar as the tractor is backed into engaging position.

A more specific object of the present invention is to provide a tractor-trailer drawbar coupling wherein the drawbar is provided with special positioning plates adapted to wedgingly engage complementary portions of the trailer during the coupling operation to urge the units into a proper alined position relative to each other.

Further objects of the present invention are to provide an improved tractor-trailer drawbar coupling as described, which device is of very simple construction, is adaptable to conventional gooseneck draw bars, is automatic in its operation, is safe to use, and is well adapted for the purposes described.

With the above and other objects in view, the invention consists of the improved tractor-trailer drawbar coupling, and all of its parts and combinations as set forth in the claim, and all equivalents thereof.

In the accompanying drawing, wherein the same reference characters indicate the same parts in all of the views:

FIG. 1 is a fragmentary side elevational view of a tractor-low bed-trailer assemblage provided with the improved drawbar coupling mechanism, showing the drawbar disconnected from the trailer;

FIG. 2 is a fragmentary vertical sectional view of the drawbar and trailer in coupling position, taken along line 2—2 of FIG. 3, and showing in broken lines, the drawbar in an initial position of misalignment relative to the trailer;

FIG. 3 is an enlarged fragmentary side elevational view of the drawbar and trailer in coupled position, and showing in broken lines the position of the drawbar prior to its proper connection with said trailer; and FIG. 4 is an enlarged fragmentary front view of a portion of the integral aligning mechanism characterizing the present invention.

The general construction and operation of the gooseneck drawbar coupling hereinafter described is disclosed in my Patent No. 2,822,945, issued February 11, 1958, and the construction characterizing the present invention is intended primarily as an improvement on my said earlier device to enhance its utility. In my earlier structure I provided a novel coupling device whereby the tractor and trailer units could be connected regardless of the degree of inclination of the front end of the trailer, thereby permitting the fast and efficient coupling of said units even while the trailer front end is still in a lowered position in engagement with the ground, the mechanism being so designed that a subsequent movement of the tractor automatically raised the trailer and placed the assemblage in a transportable condition. The present invention, as will be seen, is intended to increase the efficiency and utility of said coupling mechanism by providing means for insuring that the tractor-carried drawbar and trailer units will be in perfect alignment during the coupling operation.

The type of tractor and trailer assemblage with which the present invention is ordinarily employed includes a conventional tractor 10, having a longitudinal main frame or chassis 11 supported on traction wheels 12, and a low bed type of trailer 13 having an elongated carrying platform 14. The forward portion of the tractor (not shown) may, of course, include a cab and front wheels. Mounted on the rear end portion of the tractor 10 is a conventional fifth wheel structure 16 in which a fifth wheel plate 17 is carried by a horizontal transverse pivot pin 18, said fifth wheel plate being tiltable from its normal horizontal position to the inclined position of FIG. 1 in alignment with the surface of an inclined ramp 19 mounted on the rear end of the tractor. The gooseneck drawbar 20 carries a conventional kingpin (not shown) for releasable engagement with the tractor fifth wheel plate 17, and may be engaged within the tractor fifth wheel assemblage, as shown in FIG. 1, or it may be disengaged therefrom and slid down the ramp 19 when the tractor 10 is propelled forwardly for the purpose of lowering the forward end of the trailer into engagement with the ground; for loading and unloading as is more fully described in my said issued patent.

The gooseneck drawbar 20 includes a substantially horizontal forwardly extending portion 21 which is connectible to the tractor as described, and a downwardly extending rear portion 22 which is releasably attachable to the forward end of the trailer unit 13. For the latter purpose, the front end of said trailer 13 is provided with a forwardly opening bifurcated standard fifth wheel 23 which at its closed end includes a kingpin spring locking device or the like for securing the end of the drawbar therein, there being a kingpin 30 depending from said drawbar and arranged to be received within said fifth wheel.

With particular reference to FIGS. 1 and 3, it will be observed that the depending rear end portion 22 of the drawbar carries transversely a box-like kingpin bearing plate 26 which is pivotally mounted on said drawbar to permit self adjustment thereof to any angle of approach of the rear end of the drawbar relative to the front end of the trailer during the coupling operation. The drawbar kingpin 30 is secured to and depends from an intermediate portion of said bearing plate box 26 as hereinabove described and is adapted to engage the said bifurcated fifth wheel 23 formed in the front end portion of the trailer 13, to releasably connect said trailer and drawbar. A pair of hooking members or stirrups 32 are pivotally carried on opposite sides of the downturned end portion 22 of the drawbar and are arranged to swing fore and aft in a vertical plane to engage and disengage a pair of forwardly projecting dowels 25 formed on the forward end of the trailer to further secure said trailer and drawbar in their attached condition.

In the operation of the coupling mechanism, and as disclosed in my said Patent No. 2,822,945, at a point of destination where the trailer load is to be removed from the front end of the trailer or where the trailer is to be provided with a load, the front end of the drawbar 20 is first released from the tractor fifth wheel plate 17. The tractor is then moved forwardly, permitting the released front end of the drawbar 20 to slide down the tractor ramp 19 until the front end of the trailer 13 engages the ground. At this point, the driver will swing the stirrups 32 upwardly away from the trailer carried dowels 25. Thereafter, the tractor may be backed up slightly to ride the forward end of the gooseneck drawbar upwardly on the tractor ramp 19 and to re-engage the front end of the drawbar with the tractor fifth wheel assemblage 16. With the front end of the drawbar thus re-engaged with the tractor, the tractor is propelled forwardly away from the trailer and the drawbar kingpin 30 is disengaged from and pulled free of the trailer fifth wheel plate 23. Thus, the trailer may be detached from the tractor and drawbar for loading or unloading from its then unobstructed front end.

To re-engage the rear end of the drawbar 20 with the lowered front end of the trailer, a reverse operation is performed when the tractor is backed into rough alignment with the front end of the trailer, the forward end of the drawbar then being released and the kingpin 30 being engaged with the trailer fifth wheel plate 23, following which the drawbar-carried stirrups 32 are swung down over the trailer-carried dowels 25 to lock the drawbar and trailer together. The tractor is then further backed toward the trailer, causing the front end of the drawbar to ride up on the ramp 19 and to re-engage the tractor fifth wheel assemblage, and in so doing the front end of the trailer is elevated and the assemblage is in its transportable condition.

Unfortunately, as hereinbefore mentioned, to connect the drawbar to the forward end of the trailer those two members must be in perfect lateral alignment and it is frequently found that there is some misalignment due to the tractor being backed at an angle to the axis of the trailer. Under these conditions, the kingpin 30 on the lower end of the gooseneck can usually slide into the forward slotted portion of the plate 23 on the trailer and make engagement therewith, but the stirrups 32 will not be in such alignment with the dowels 25 which will permit their being swung down over the dowels into proper engaging position. To remedy this situation, the special positioning or aligning members of the present invention have been incorporated into the drawbar coupling device and will now be described.

As is best shown in FIGS. 2 and 4, a rectangular crossbar 36 is extended between and supported by the sides of the down-turned end portion 22 of the drawbar, and a pair of wedge or positioning plates 37 and 38 are welded to and depend from the outer face of said crossbar. As illustrated in FIG. 2, said plates 37 and 38 are positioned, upon retrograde movement of the tractor carrying the drawbar, to abut frame portions 39 and 40 of the trailer, said trailer portions 39 and 40 are the rectangular, forwardly-projecting members on which the dowel pins 25 are mounted. The outermost lower corner portions of said plates 37 and 38 are cut diagonally to provide angled cam or wedge surfaces 37' and 38', and the inner corners of said adjacent trailer portions 39 and 40 are similarly angled to provide complementary angled wedging surfaces 39' and 40'. Said cross bar and plate members are preferably formed of heavy steel, or similar durable and wear resistant metal, and are securely attached to said crossbar in order to properly perform their intended function, as will be seen.

In the operation of a coupling mechanism provided with the above described position aligning members, as the drawbar is lowered into coupling position relative to the lowered trailer, as described, the inclined surfaces of said positioning plates 37' and 38' will ride against the inclined surfaces 39' and 40' of the complementary trailer portions. If the tractor and trailer units are not in exact alignment, the wedging action of one or the other of said plates 37 or 38, against the adjacent surface of the trailer, will cause a relative shifting between the drawbar and trailer to effect perfect mutual alignment of said members. This action is illustrated in FIG. 2, wherein the positioning plates 37 and 38 are shown in broken lines in a position of misalignment to the left of center relative to the trailer end portions 39 and 40. As the drawbar is further moved into coupling position, however, it is apparent that the angled edge 37' of the plate 37 will engage the upper corner of the trailer end portion 39 and, as the drawbar continues downwardly, the wedging action of said abutting members will cause relative lateral shifting to permit the drawbar to be moved into the final properly aligned position shown in full lines.

With the tractor and trailer units thus aligned, the stirrups 32 may be swung down over the dowel pins 25 with which they now perfectly register to hook said units together, following which the tractor may be moved rearwardly to raise the forward end of the trailer and put it into its normal position for transport, as hereinbefore described.

From the foregoing, it will be seen that the essence of the present invention lies in the provision of a pair of eccentric positioning plates 37 and 38 mounted on the lower end and depending from the gooseneck drawbar 22 in a manner whereby the angled surfaces of said plates will wedgingly and pressurably engage complementary angled surfaces on the trailer to cause relative lateral shifting to a position of perfect coupling alignment. The result is a coupling assemblage for tractor-trailer assemblages which is not only adapted to function regardless of the inclination of the front end of the trailer, but to accomplish aligned coupling of said tractor and trailer units despite any lateral deviation between said units due to a miscalculation on the part of the driver, or any other reason. The mechanism is also safe, easy and automatic in its operation, and is otherwise well adapted for the purposes described.

It is to be understood, of course, that various changes and modifications may be made in the improved assemblage hereinabove-described without departing from the spirit of the invention, and all such changes and modifications are contemplated as may come within the scope of the following claim.

What I claim is:

In a tractor-low bed trailer coupling assemblage wherein the front end portion of the trailer has a pair of forwardly-projecting, laterally spaced-apart dowels, and wherein the front portion of the trailer carries a fifth wheel, which assemblage includes a gooseneck drawbar detachably connected to and extending rearwardly from said tractor, said drawbar having a downturned rear end portion having a depending kingpin releasably connectible to said trailer fifth wheel, and which coupling assemblage includes a pair of hooking members vertically swingably carried by the lower rear end portion of the gooseneck drawbar for releasable engagement with said trailer-carried dowels, complementary means formed on the rear end portion of the drawbar and the front end portion of the trailer to effect coupling alignment between the drawbar and trailer, including: a cross bar rigidly carried by and between the opposite sides of said drawbar lower rear end portion; a pair of laterally spaced-apart wedge plates mounted on and depending from said cross bar adjacent the outer ends thereof, the outer lateral faces of said plates having diagonally cut lower corner portions inclined downwardly, inwardly; and portions on said trailer abutting said diagonally-cut corner portions of said wedge plates having similarly downwardly angled abutting surfaces and forming wedge means to forcibly relatively shift said drawbar and trailer units into mutual vertical and lateral alignment when the drawbar is lowered into coupling position relative to the trailer.

References Cited in the file of this patent
UNITED STATES PATENTS

| | | |
|---|---|---|
| 2,822,945 | Duffy | Feb. 11, 1958 |
| 2,944,834 | Hill | July 12, 1960 |
| 2,953,396 | Meadows | Sept. 20, 1960 |